March 29, 1966   D. E. LEE   3,243,124
NOZZLE MOUNTING FOR ROCKET MOTOR
Filed May 1, 1961   2 Sheets-Sheet 1

INVENTOR.
DAVID E. LEE
BY
D. Gordon Angus
ATTORNEY

March 29, 1966 D. E. LEE 3,243,124
NOZZLE MOUNTING FOR ROCKET MOTOR
Filed May 1, 1961 2 Sheets-Sheet 2

INVENTOR.
DAVID E. LEE
BY
D. Gordon Angus
ATTORNEY

United States Patent Office 3,243,124
Patented Mar. 29, 1966

3,243,124
NOZZLE MOUNTING FOR ROCKET MOTOR
David E. Lee, Sacramento, Calif., assignor to Aerojet-General Corporation, Azusa, Calif., a corporation of Ohio
Filed May 1, 1961, Ser. No. 107,284
1 Claim. (Cl. 239—127.1)

The present invention relates to flexible nozzles for rocket motors and has for its object to prevent gas leakage and binding of the flexible nozzle within the rocket motor housing.

Better control of rocket motors can be accomplished by redirection of motor exhaust gas flow. Popular steering control schemes at present include jet flame deflectors and reaction-type controls or "Jetavators" that are mounted adjacent the exhaust opening of the reaction motor. These reaction controls are operable to deflect the high velocity fluid discharge from the motor to exert both vertical and horizontal steering movements to the craft. These control devices are normally placed in the exhaust gas stream. Because these devices redirect supersonic flow, material problems are severe and shock waves and drag losses occur lowering the rocket motor efficiency.

The rocket motor nozzle may also be rotated relative to the rocket motor housing in order to redirect gas flow. The primary improvement of this type of direction control device is, as noted above, that the control device allows the redirection of gas flow without introduction of detrimental supersonic flow discontinuities. However, two outstanding problems associated with the design of the flexible nozzle are the prevention of motor gas mass flow and mechanical binding at the interface of the flexible components and the stationary components.

In accordance with the present invention, gas leakage has been eliminated by the mechanical sealing of the movable nozzle to the housing. The present invention includes a rocket motor housing receiving a nozzle that is flexibly mounted. A seal is attached to the nozzle and the housing to prevent gas leakage. An annulus-shaped inlet diffuser abuts the nozzle and acts to inhibit gas flow impingement on the forward end of the nozzle.

Figure 1:
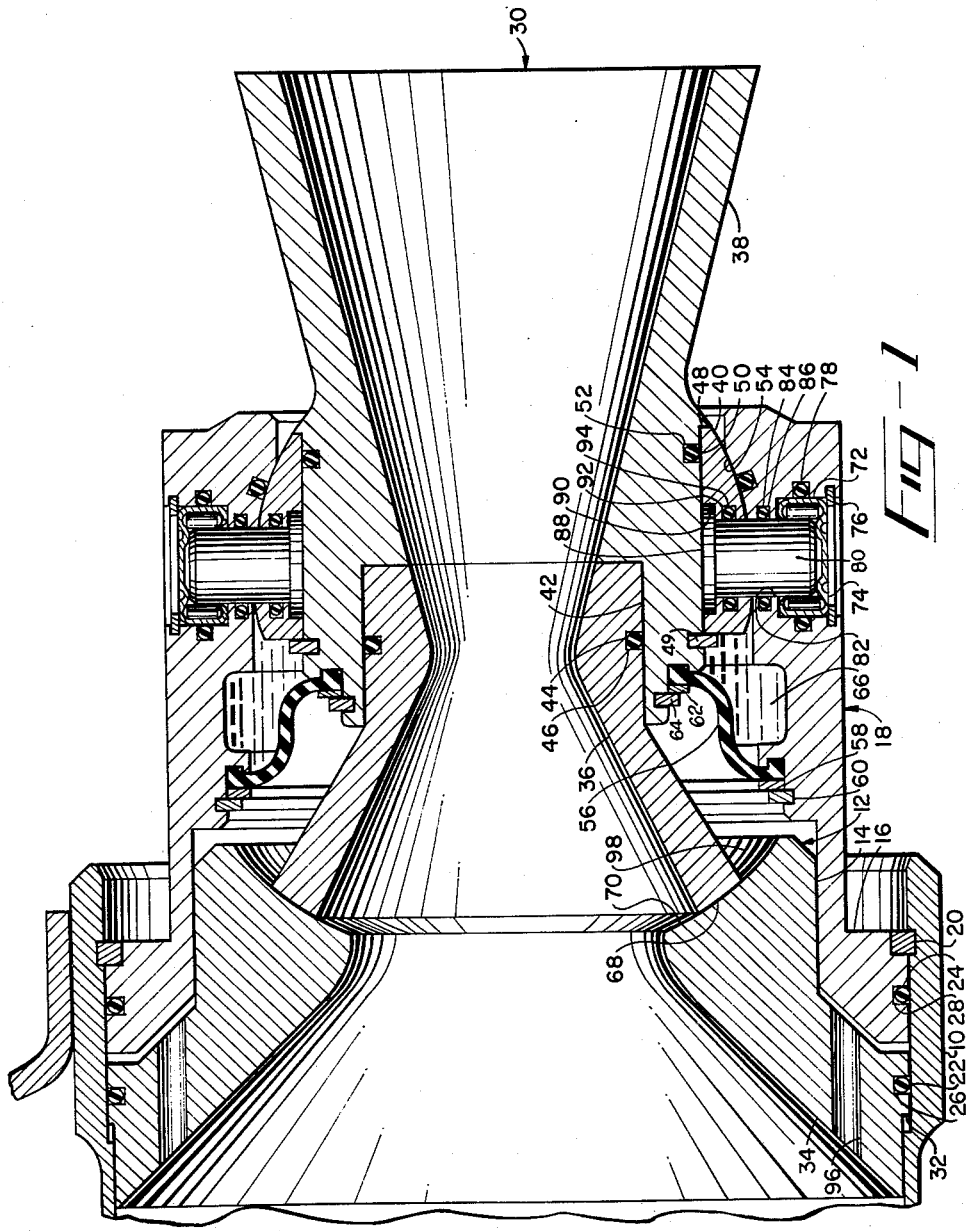
Figure 2:
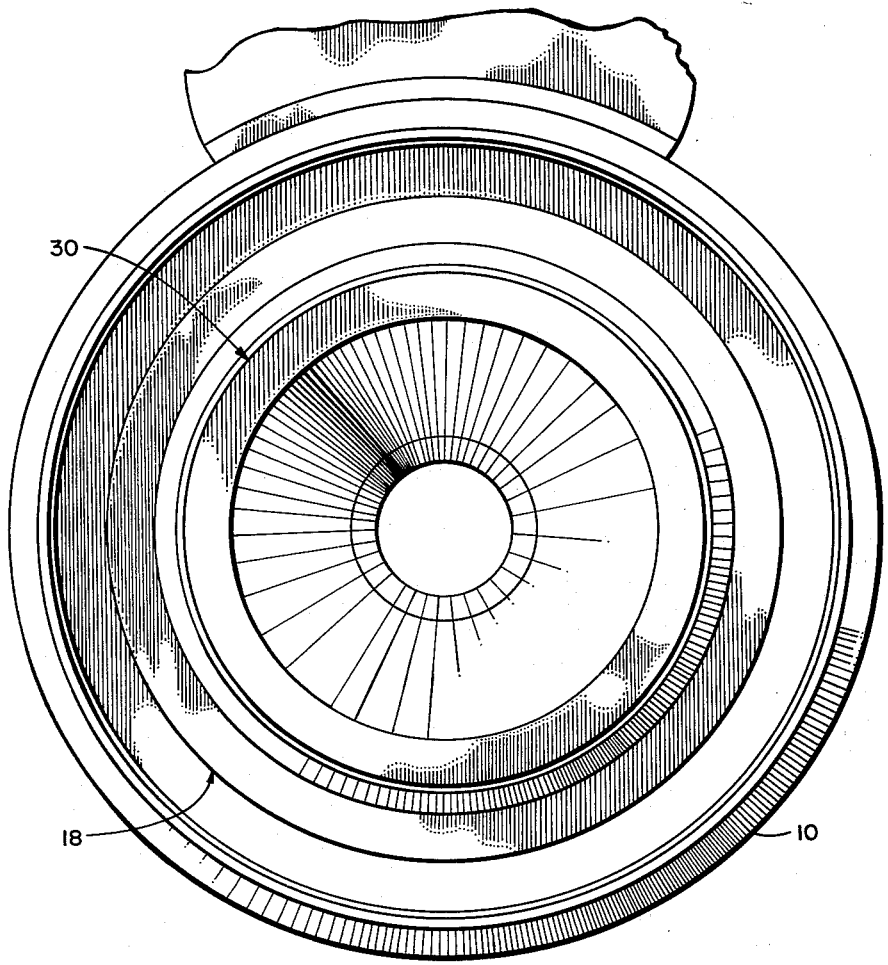

Other features and advantages not specifically numerated above will be apparent after consideration of the following detailed description and the appended claim. The preferred form which the invention may assume is illustrated in the accompanying drawings in which:

FIGURE 1 is a partial longitudinal cross section of a rocket motor constructed in accordance with the present invention; and FIGURE 2 is an end elevation looking at the nozzle end of the rocket motor shown in FIGURE 1.

Before explaining the present invention in detail, it is to be understood that the invention is not limited in its application to the details of construction and arrangement of parts illustrated in the accompanying drawings, since the invention is capable of other embodiments and of being carried out in various ways. Also, it is to be understood that the phraseology or terminology employed herein is for the purpose of description and not of limitation.

Referring to FIGURES 1 and 2, a rear-most portion of a rocket motor housing 10 is illustrated enveloping an annular inlet diffuser 12. A recess 14 formed in the inlet diffuser 12 is concentric with the interior of the housing 10 and receives foot portion 16 of the housing extension 18. A snap ring 20 restrains the longitudinal movement of the housing extension 18. A pair of O-ring seals 22, 24 are received by grooves 26, 28 in the inlet diffuser 12 and housing extension 18, respectively.

As shown in FIGURE 1, the bottom of the recess 14 in the inlet diffuser 12 is in spaced relation with the foot portion 16 of the housing extension 18 allowing the inlet diffuser 12 to float with changes in position of the nozzle 30. A step 32 in the housing 10 and the snap ring 20 limit longitudinal or axial movement of the inlet diffuser 12 to a nominal selected valve.

The inlet diffuser 12 has an incline portion 34 which deflects all rocket motor gas toward the nozzle 30.

The nozzle 30 is composed of the throat insert 36, the exit cone 38, and the ball sleeve 40. The throat insert 36 is pressed into the recess 42 of the exit cone 38 and is in sealing engagement therewith. An O-ring seal 44, received by a groove 46 in the throat insert 36, contacts the portion of the exit cone 38 bounding the recess 42. The ball sleeve 40 abuts the step 48 and is retained on the exit cone 38 by a snap ring 49. An O-ring seal 50, received by a groove 52, is in sealing engagement with the ball sleeve 40. The exterior surface of the ball sleeve 40 has a convex spherical shape thereon and is received by a corresponding mating concave spherical shape 54 on the housing extension 18.

An annulus-shaped flexible diaphragm 56 is fixedly attached to the exit cone 38 and the housing extension 18. A spacer 58 and snap ring 60 positively hold the diaphragm 56 in position against the housing extension 18. A corresponding spacer 62 and snap ring 64 hold the diaphragm 56 in position against the exit cone 38. The cavity 66 formed between the diaphragm 56, the exit cone 38, the ball sleeve 40, and the housing extension 18 may be filled with a hydraulic fluid. The fluid will support the diaphragm 56 while in use and will absorb the heat which could act on the opposite side of the diaphragm 56.

At one extremity of the throat insert 36 is a convex spherical shape 68 which abuts a mating concave spherical shape 70 on the inlet diffuser 12 to thereby create a mechanical seal between the nozzle 30 and the housing 10.

A pair of needle bearings 72 are received within bores 74, positioned coaxially on opposite sides of the housing extension 18. A snap ring 76 retains each bearing 72 within its respective bore 74. An O-ring seal 78 prevents excessive leakage past the bearing 72.

A trunnion pin 80 is rotatably received by the bearing 72 and a bore 82 in the housing extension 18. An O-ring seal 84, received within the groove 86 of the housing extension 18, prevents gas leakage past the trunnion pin 80. The trunnion pin head 88 is received by a ball sleeve counterbore 90 that prevents the axial movement of the pin 80 within its mounting. Another O-ring seal 92 is received by the groove 94 in the ball sleeve 40 and prevents leakage past the pin 80.

The flexible diaphragm 56 is the primary seal of the present invention and it prevents mass flow from entering the area of the bearings 72, the interface of the movable ball sleeve 40 and the stationary housing extension 18. The fluid in cavity 66 protects the flexible diaphragm by acting as a hydraulically rigid support and a heat sink. Thus, as the volume of the cavity 66 remains a constant and as the hydraulic fluid is incompressible, the flexible diaphragm 56 will not be deflected by the presence of motor gas pressure existing in the cavity 98 forwardly of the flexible diaphragm 56. The temperature rise of the flexible diaphragm 56 is to be limited by the heat sink properties of the hydraulic fluid contained within the cavity 66.

As the pressure of the motor gas in the cavity 98 forwardly of the flexible diaphragm 56 approximates the internal nozzle pressure in the area of the throat insert 36, the pressure differential across the throat insert 36 approaches zero. Thus, the motor gas mass flow, which is a function of the pressure differential, at the interface of the movable throat insert 36 and the inlet diffuser 12 approaches zero. Motor gas pressure is bled into the cavity 98 via the inlet passages 96 and the interface of the inlet diffuser 12 and the housing extension foot portion 16.

The inlet diffuser 12 is free to move a limited axial distance along the housing 10. Once the motor firing commences, the inlet diffuser 12 is urged into contact with the throat insert 36 by motor gas impingement pressures acting thereon. Thus, a sealing interface is created of sufficiently high quality to prevent mass flow of motor gas into the cavity 98 forwardly of the flexible diaphragm 56. In addition, as the motor pressure and mass flow provide the force urging the inlet diffuser 12 into contact with the throat insert 36, the resultant sealing force is proportional to the sealing requirements. The sealing force, however, is not of sufficient magnitude to seriously impede the freedom of movement of the nozzle 30. The floating nature of the insert diffuser 12 also freely compensates for differential thermal expansion between the diffuser 12 and the throat insert 36.

The throat insert 36, the inlet diffuser 12, the ball sleeve 40, the housing extension 18 present spherical surfaces to one another. This arrangement allows unrestricted movement of the nozzle. However, the rotation of the nozzle is about an axis which is the center line of the trunnion pins 80. Therefore, the rotation of the nozzle assembly, including the trunnion pins 80, is restricted to movement about the axis of the trunnion pins 80 which is perpendicular to the axis of the nozzle assembly such that the nozzle assembly may swing laterally with its own axis confined to movement within a single plane. The thrust load in this design arrangement is carried entirely by the bearings 72. Thus, the resultane friction forces are significantly less than if the turning load was carried entirely by the spherical surfaces of the housing extension 18. In addition to backing and cooling the flexible diaphragm 56, the heat sink hydraulic fluid in cavity 66 affords lubrication to the interface of the ball sleeve 40 and the housing extension 18.

Although a specific embodiment of the invention has been shown and described, it will be understood, of course, that it is only illustrative and that various modifications may be made therein without departing from the scope and spirit of this invention as defined in the appended claim.

I claim:

A rocket motor comprising a housing, a nozzle having an intermediate throat portion and a forwardly extending convex spherical end portion, an annulus-shaped housing extension fixedly attached to said housing and slidably receiving said nozzle, said housing including a concave spherical diffuser portion of a shape mating with the convex spherical end portion of said nozzle, a flexible annular diaphragm extending between said housing extension and said intermediate throat portion of said nozzle and fixedly attached at its outer and inner peripheries to said housing extension and said intermediate throat portion of said nozzle respectively, said diaphragm being disposed in rearwardly spaced relation to said concave spherical diffuser portion of said housing; said diaphragm, said housing extension, and said intermediate throat portion of said nozzle cooperating to define a chamber; a heat resistant fluid in said chamber, said concave spherical diffuser portion of said housing being in abutting sliding sealing relation with said forwardly extending convex spherical end portion of said nozzle and having a plurality of axial passages extending therethrough, said plurality of axial passages being disposed radially outwardly with respect to said nozzle; said diaphragm, said housing extension, said concave spherical diffuser portion of said housing, and said convex spherical end portion of said nozzle cooperating to define a cavity disposed forwardly of said chamber and separated therefrom by said diaphragm; and said axial passages providing communication between the interior of said housing and said cavity to equalize the pressure in said cavity with the pressure within the interior of the intermediate throat portion of said nozzle.

References Cited by the Examiner

UNITED STATES PATENTS

| | | | |
|---|---|---|---|
| 3,048,977 | 8/1962 | Geary | 60—35.55 |
| 3,049,877 | 8/1962 | Sherman | 60—35.55 |
| 3,064,419 | 11/1962 | Ward | 60—35.55 |
| 3,069,853 | 12/1962 | Eder | 60—35.55 |
| 3,090,198 | 5/1963 | Zeisloft | 60—35.54 X |

FOREIGN PATENTS

| | | |
|---|---|---|
| 1,246,339 | 10/1960 | France. |
| 789,836 | 1/1958 | Great Britain. |

MARK NEWMAN, *Primary Examiner.*

BENJAMIN A. BORCHELT, SAMUEL BOYD, SAMUEL FEINBERG, SAMUEL LEVINE,
*Examiners.*

G. L. PETERSON, A. L. SMITH, *Assistant Examiners.*